(12) United States Patent
Swift et al.

(10) Patent No.: US 11,415,225 B2
(45) Date of Patent: Aug. 16, 2022

(54) SEAL ASSEMBLY WITH DEFLECTING RUNNER MOUNT ASSEMBLY

(71) Applicant: Rolls-Royce Corporation, Indianapolis, IN (US)

(72) Inventors: Joseph Swift, Indianapolis, IN (US); Daniel Feinstein, Zionsville, IN (US); Caleb Camara, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 606 days.

(21) Appl. No.: 16/419,666

(22) Filed: May 22, 2019

(65) Prior Publication Data

US 2020/0370651 A1    Nov. 26, 2020

(51) Int. Cl.
*F16J 15/16*      (2006.01)
*F16J 15/34*      (2006.01)

(52) U.S. Cl.
CPC ......... *F16J 15/164* (2013.01); *F16J 15/3464* (2013.01); *F16J 15/3496* (2013.01)

(58) Field of Classification Search
CPC ........ F16J 15/164; F16J 15/34; F16J 15/3464; F16J 15/3472; F16J 15/3476; F16J 15/348; F16J 15/3496
See application file for complete search history.

(56) References Cited

U.S. PATENT DOCUMENTS

| | | | |
|---|---|---|---|
| 6,322,081 B1 | 11/2001 | Ullah et al. | |
| 7,905,495 B2 | 3/2011 | Munson | |
| 2009/0142180 A1* | 6/2009 | Munson | F01D 11/003 415/111 |
| 2012/0177486 A1* | 7/2012 | Ullah | F02C 7/28 415/174.3 |
| 2014/0265151 A1* | 9/2014 | Vasagar | F01D 11/003 277/500 |
| 2017/0234430 A1 | 8/2017 | Fadgen | |
| 2017/0234432 A1 | 8/2017 | Burnside et al. | |
| 2020/0248814 A1* | 8/2020 | Schubert | F16J 15/26 |
| 2020/0248815 A1* | 8/2020 | Bernacchi | F16J 15/26 |

FOREIGN PATENT DOCUMENTS

WO      2014/143097 A1      9/2014

OTHER PUBLICATIONS

U.S. Appl. No. 15/426,281 "Ceramic Seal Runner Support System".
U.S. Appl. No. 16/118,859 "Seal Runner Support".
U.S. Appl. No. 16/265,506 "Seal Assembly with Spring Retainer Runner Mount Assembly".
U.S. Appl. No. 16/265,557 "Mounting Assembly for a Ceramic Seal Runner".
U.S. Appl. No. 16/285,476 "Mounting Assembly for a Ceramic Seal Runner".

* cited by examiner

*Primary Examiner* — Gilbert Y Lee
(74) *Attorney, Agent, or Firm* — Barnes & Thornburg LLP

(57) ABSTRACT

A seal assembly is disclosed for sealing a higher pressure fluid cavity from a lower pressure fluid cavity. The seal assembly comprises a runner mounting assembly, a circumferential ceramic runner carried by the runner mount assembly, and a carbon seal ring sealingly engaged to the runner. The runner mount assembly comprises an annular central junction portion radially spaced from the shaft, a pair of shaft engaging flanges, and a pair of runner engaging flanges. The runner is radially positioned between the runner engaging flanges of the runner mount assembly and the carbon seal ring.

20 Claims, 9 Drawing Sheets

SEAL ASSEMBLY WITH DEFLECTING RUNNER MOUNT ASSEMBLY

BACKGROUND

Seals and seal assemblies may be used to isolate cavities of different pressures in a machine. For example, in a gas turbine engine a seal assembly may be used to seal a sump from higher pressure and temperature airflows elsewhere in the engine, such that oil is retained in the sump and not permitted to migrate to other regions of the engine. Oil leakage from a sump can lead to undesirable conditions such as fires, smoke, coking, and migration of oil smell.

A seal assembly typically comprises a seal ring engaged with a runner. The runner is often carried by a runner mount that is coupled to a rotatable shaft. Engagement between the seal ring and runner creates the seal.

Some existing runner mounts hold the runner in place by contacting both a radially inner and a radially outer surface of the runner. These runner mount designs can lead to excessive stresses in the runner and/or the runner mount due to edge loading along the runner/runner mount interface at the radially outer surface of the runner. These runner mount designs also require that a portion of the radially outer surface of the runner—i.e. the surface that forms a seal through engagement with the seal ring—be dedicated to mounting as opposed to sealing. Improvements in runner mount designs are therefore desirable.

SUMMARY

According to some aspects of the present disclosure, a seal assembly is disclosed for sealing a higher pressure fluid cavity from a lower pressure fluid cavity. The cavities are at least partially disposed between a rotatable shaft and a housing radially displaced from the rotatable shaft. The seal assembly comprises a runner mounting assembly, a carbon seal ring, and an annular ceramic runner. The runner mounting assembly is carried by the shaft and comprises an annular central junction portion radially spaced from the shaft; a pair of shaft engaging flanges extending axially from the central junction portion, each of the flanges terminating in a shaft engaging portion; and a pair of runner engaging flanges extending radially outward and axially from the central junction portion, each of the flanges terminating in a runner mount land. The carbon seal ring is sealingly engaged with the housing and has a radially inward facing seal surface. The annular ceramic runner has a radially outward facing seal surface and a radially inward facing mount surface. The runner is radially positioned between the runner mount lands and the carbon seal ring so that the radially inward facing seal surface of the carbon seal ring sealingly engages the radially outward facing seal surface of the runner to thereby form a boundary between the higher pressure fluid cavity and the lower pressure fluid cavity.

In some embodiments at least one of the pair of shaft engaging flanges and the pair of runner engaging flanges deflect to maintain engagement of the ceramic runner and seal ring while accommodating thermal expansion of the shaft. In some embodiments at least one of the pair of shaft engaging flanges and the pair of runner engaging flanges impart spring action to maintain engagement of the ceramic runner and seal ring while accommodating thermal contraction of the shaft. In some embodiments the radially outward facing seal surface of the ceramic runner is free of loading from the runner mounting assembly.

In some embodiments the central junction portion is positioned at an axial midpoint between an axial terminus of each of the pair of shaft engaging flanges. In some embodiments the central junction portion is positioned at an offset from an axial midpoint between an axial terminus of each of the pair of shaft engaging flanges. In some embodiments one of the pair of shaft engaging flanges comprises an axial retainer to maintain an axial position of the runner mounting assembly relative to the shaft. In some embodiments one of the pair of runner engaging flanges comprises an axial locator to maintain an axial position of the ceramic runner relative to the runner mounting assembly.

In some embodiments the pair of runner engaging flanges comprises a first runner engaging flange extending axially forward and radially outward from the central junction portion and a second runner engaging flange extending axially aft and radially outward from the central junction portion. In some embodiments the pair of shaft engaging flanges comprises a first shaft engaging flange extending axially forward and radially inward from the central junction portion and a second shaft engaging flange extending axially aft and radially inward from the central junction portion.

In some embodiments the runner mounting assembly comprises metal. In some embodiments the runner and the seal ring are formed from materials having coefficients of thermal expansion that are matched to effect sealing engagement between the runner and the seal ring over a predetermined range of operating temperatures. In some embodiments the seal assembly further comprises a garter spring coupled to a radially outward facing surface of the seal ring, the garter spring sealingly engaging the radially inward facing seal surface of the seal ring with the radially outward facing seal surface of the ceramic runner across a predetermined range of rotational speeds.

According to further aspects of the present disclosure, a mount for carrying a ceramic runner from a rotatable shaft is disclosed. The mount comprises an annular central junction portion, a pair of shaft engaging flanges extending axially from the central junction portion, each flange of the pair of flanges terminating in a shaft engaging portion, and a pair of runner carrying arms extending axially and radially outward from the central junction portion, each of the arms in the pair of runner carrying arms terminating in a runner mount land.

In some embodiments the pair of shaft engaging flanges extend axially and radially inward from the central junction portion. In some embodiments the central junction portion is positioned at an axial midpoint between an axial terminus of each of the pair of shaft engaging flanges. In some embodiments the central junction portion is positioned at an offset from an axial midpoint between an axial terminus of each of the pair of shaft engaging flanges.

In some embodiments the mount further comprises an axial retainer extending from one of the pair of shaft engaging flanges to maintain an axial position of the runner mounting assembly relative to the shaft. In some embodiments the mount further comprises an axial locator extending from one of the pair of runner engaging flanges to maintain an axial position of the ceramic runner relative to the runner mounting assembly.

According to yet further aspects of the present disclosure, a method is disclosed of sealing a higher pressure fluid cavity from a lower pressure fluid cavity. The cavities are at least partially disposed between a rotatable shaft and a housing radially displaced from the rotatable shaft. The method comprises providing a runner mounting assembly, an annular ceramic runner, and a carbon seal ring, wherein the runner mounting assembly is carried by the shaft and carries the ceramic runner, the runner mounting assembly comprising: an annular central junction portion radially spaced from the shaft; a pair of shaft engaging flanges extending axially from the central junction portion, each of the flanges terminating in a shaft engaging portion; and a pair of runner engaging flanges extending radially outward and axially from the central junction portion, each of the flanges terminating in a runner mount land; engaging the runner with the carbon seal ring; rotating the shaft; and deflecting at least one of the pair of shaft engaging flanges and pair of runner engaging flanges responsive to thermal transients to alter the radial position of the runner relative to the shaft.

In some embodiments the method further comprises imparting spring action from at least one of the pair of shaft engaging flanges and pair of runner engaging flanges responsive to thermal transients to alter the radial position of the runner relative to the shaft. In some embodiments the method further comprises preventing excessive axial motion of the ceramic runner with one or more axial locators.

BRIEF DESCRIPTION OF THE DRAWINGS

The following will be apparent from elements of the figures, which are provided for illustrative purposes.

Figure 1:
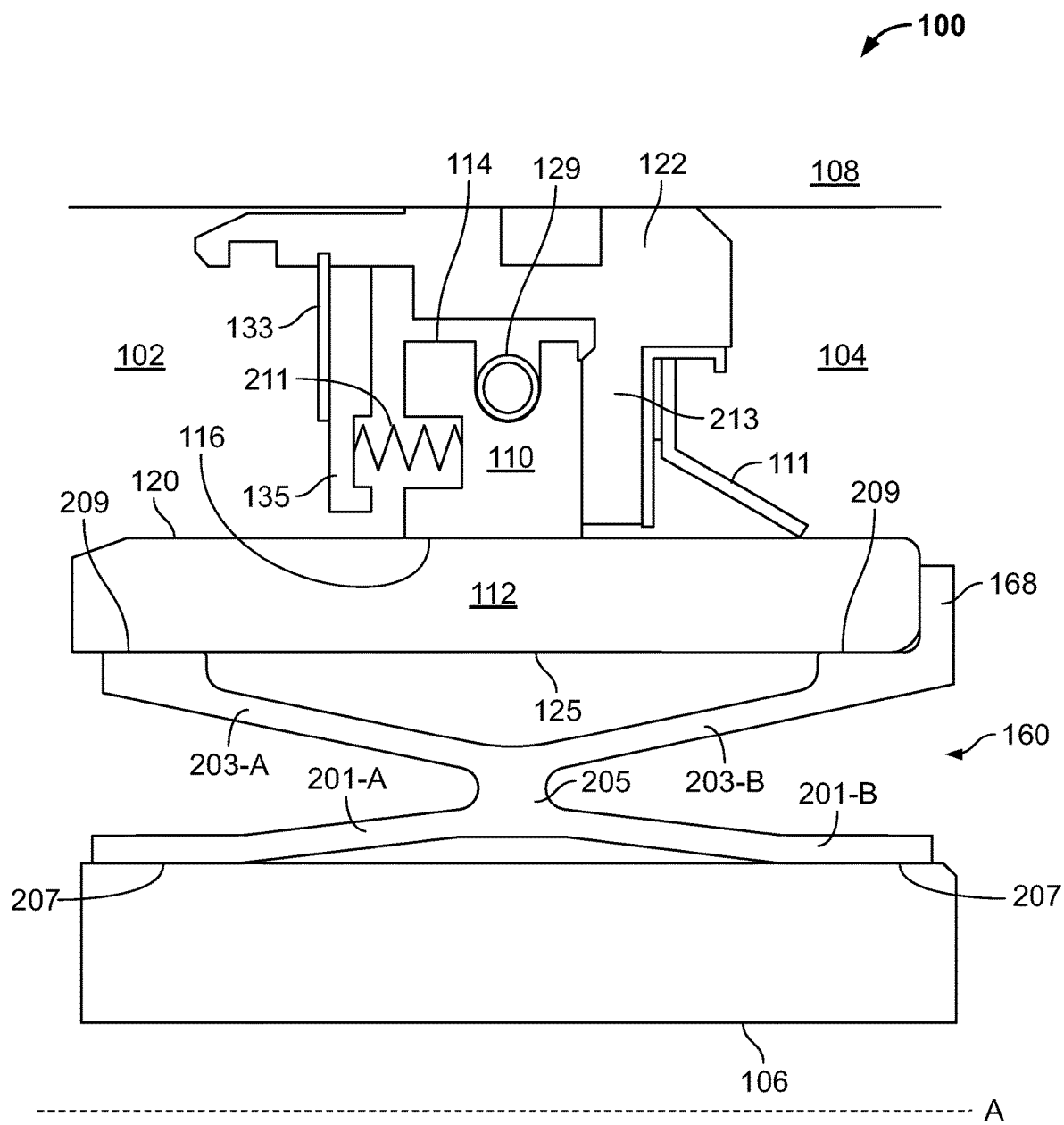
FIG. 1 is a schematic cross sectional view of a seal assembly in accordance with some embodiments of the present disclosure.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

Seal assemblies in rotating machines such as gas turbine engines that use a circumferential carbon seal ring and ceramic runner offer numerous advantages over existing seal assemblies that typically use a metal runner. Clearance between the carbon seal ring and ceramic runner can be more closely controlled because the materials of the seal ring and runner have closer and/or matched coefficients of thermal expansion. Closer clearance control over the full range of operating conditions ensures less leakage and less risk of oil passing through the seal assembly. Further, the use of a ceramic runner may allow for the reduction or elimination of direct oil cooling to the runner, as the ceramic runner is able to operate at higher temperatures. Reduction or elimination of direct oil cooling carries additional benefits, namely reducing the size and complexity of oil cooling systems.

However, a seal mount is required for this type of seal assembly in order to mount the ceramic runner to the metal rotatable shaft and compensate for the differential thermal growth between the runner and the shaft. The seal mount must provide adequate compliance between the shaft and the ceramic to accommodate any unacceptable stresses, excursions, and/or deflections.

Runners made from ceramic tend to have relatively high compressive yield strength but relatively low tensile yield strength. Ceramic runners also tend to be brittle, with a small elastic region. With these material difficulties in mind, ceramic runners must be coupled in some manner to the metal rotatable shaft of the engine. The assembly for mounting the runner to the shaft necessarily must account for differences in the coefficient of thermal expansion between the ceramic runner and the metal shaft, and must also accommodate excursions in the relative positioning between the two. Existing ceramic runner mounts may use a "clip" approach that includes runner/runner mount interfaces along both the radially inner and radially outer surfaces of the runner. These interfaces ensure that the runner mount is able to hold the runner against the seal ring to maintain an effective seal, while also allowing some degree of flexing between the runner and the rotatable shaft.

Unfortunately, the clip approach to runner mount design can negatively impact the effective lifespan of the runner and/or the runner mount. The runner/runner mount interface along the radially outer surface of the runner may experience excessive stresses (i.e. edge loading) during operation, leading to wear of one or more components at an unacceptable rate. For example, excessive wear may occur at the interface between the clip and the ceramic runner. Further, the clip approach reduces the size of the radially outer surface of the runner available for sealing because some portion of that surface is used for mounting purposes.

To prevent excessive edge loading at the runner/runner mount interface along the radially outer surface of the runner and to free a portion of that radially outer surface, the present disclosure is directed to systems and methods of forming a seal in a rotating machine. A seal assembly may comprise a runner mounting assembly, a runner, and a seal ring. The runner mounting assembly may engage the runner along the radially inner surface of the runner, and not along the radially outer surface of the runner. The runner mounting assembly may comprise a pair of shaft engaging flanges and a pair of runner engaging flanges, each joined to and extending away from a central junction portion. The runner mounting assembly may further comprise one or more axial locators and/or axial retainers. The seal assembly may further comprise a buffered annular sealing member or lip seal.

Figure 2:
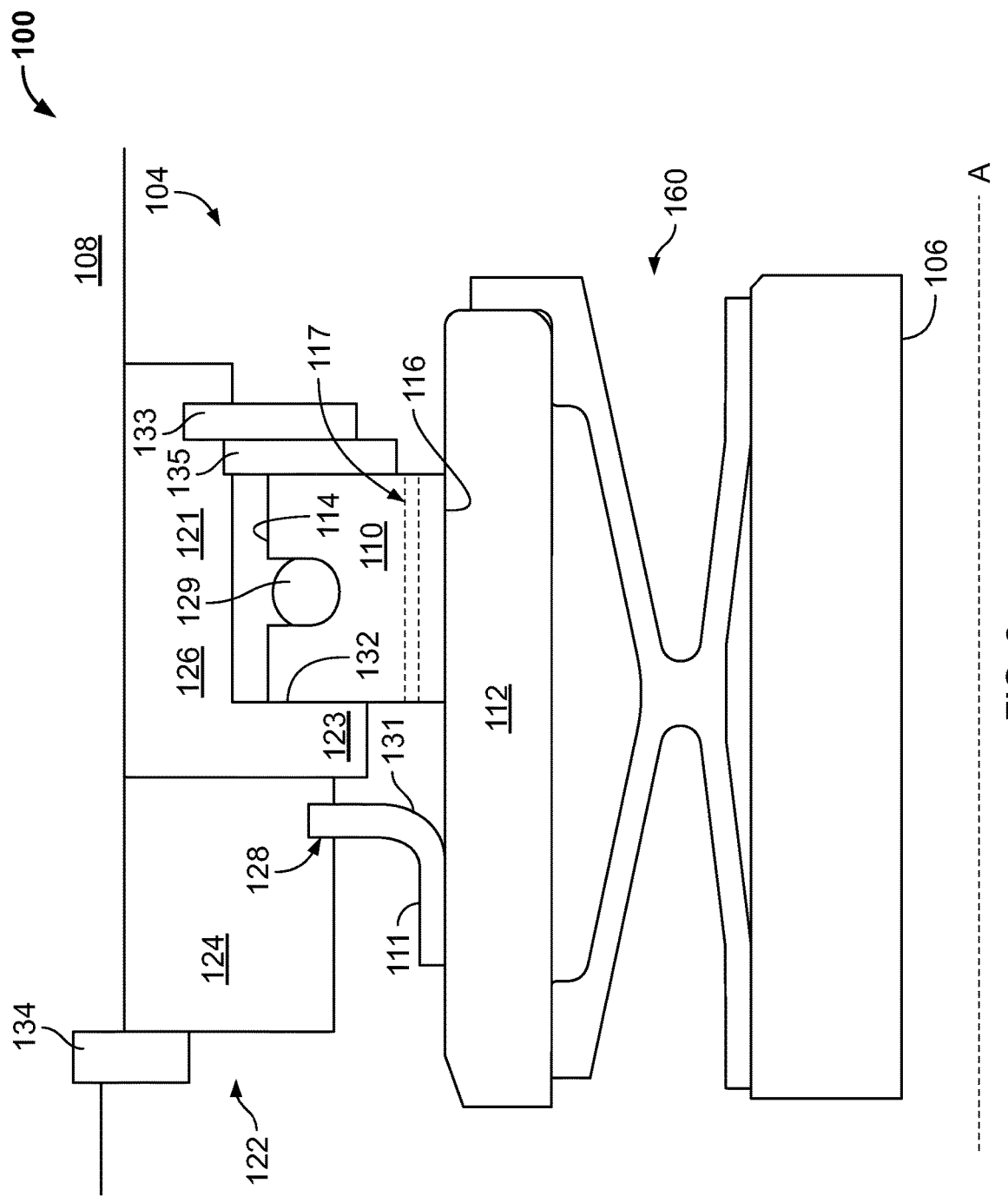
FIG. 2 is a schematic cross sectional view of a seal assembly in accordance with some embodiments of the present disclosure.

A schematic cross sectional view of an embodiment of the seal assembly 100 is provided in FIG. 1. FIG. 2 provides a schematic cross sectional view of another embodiment of the seal assembly 100. FIGS. 3A through 7B provide views of the runner mount assemblies that may be used in the seal assembly 100, and variations thereof.

With reference to FIG. 1, the seal assembly 100 seals a higher pressure fluid cavity 104 from a lower pressure fluid cavity 102. The higher and lower pressure fluid cavities 104, 102 may be at least partially disposed between a rotatable shaft 106 and a housing 108. The seal assembly 100 comprises a seal ring 110, a circumferential runner 112, and a runner mounting assembly 160.

The higher pressure fluid cavity 104 may be referred to as a first cavity, and may be, for example, a region of a rotating machine such as a gas turbine engine that receives and directs higher pressure and/or higher temperature airflow. All or a portion of the higher pressure fluid cavity 104 may comprise a buffer air chamber.

The lower pressure fluid cavity 102 may be referred to as a second cavity, and may be, for example, a region of a rotating machine such as a gas turbine engine that receives and directs lower pressure and/or lower temperature airflow. The lower pressure cavity 102 may be a sump or bearing chamber.

The rotatable shaft 106 may define an axis A of the rotating machine. The rotatable shaft may be hollow. A housing 108 may be disposed about or radially outward of the rotatable shaft 106. The housing 108 may be radially displaced from the shaft 106. The housing 108 may be a static structure of the rotating machine (i.e. may not rotate). The housing 108 may be a sump housing or similar structure, and may at least partly define each of the higher pressure fluid cavity 104 and lower pressure fluid cavity 102.

The seal ring 110 is disposed between the housing 108 and the shaft 106. The seal ring 110 may be annular, and may be formed as a single member or may comprise more than one member. In embodiments having a seal ring 110 comprising more than one member, the member may be joined for example by slip joints. The seal ring 110 may also comprise a single annular member. The seal ring 110 may have a radially outward facing surface 114 and a radially inward facing seal surface 116. The seal ring may comprise carbon.

The runner 112 may be an annular member and may be radially displaced from the shaft 106. The runner 112 may be carried by the shaft 106. The runner 112 may be carried by a runner mounting assembly 160 coupled to the shaft 106. The runner 112 may have a radially outward facing seal surface 120 and a radially inward facing mount surface 125 extending axially along the shaft 106. The runner 112 may comprise ceramic. The runner 112 may comprise silicon carbide, silicon nitride, or alumina.

The seal ring 110 may be an archbound carbon seal. The seal ring 110 may sealingly engage the runner 112. A seal ring 110 that is sealingly engaged with a runner 112 is in contact with the runner 112 or in sufficient proximity to the runner 112 such that a seal is formed between the seal ring 110 and runner 112. The radially inward facing seal surface 116 of the seal ring 110 may sealingly engage the radially outward facing seal surface 120 of the runner 112. In some embodiments, the radially inward facing seal surface 116 of the seal ring 110 may contact the radially outward facing seal surface 120 of the runner 112.

The seal ring 110 and runner 112 may be formed from materials having coefficients of thermal expansion that are matched or nearly matched to effect sealing engagement between the seal ring 110 and runner 112 over a predetermined range of operating temperatures.

The runner mounting assembly 160 may be carried by the shaft 106, and may extend radially from the shaft 106 to space the runner 112 from the shaft 106. The runner mount assembly 160 may be fit to the shaft 106, for example with an interference, clearance, or transitional fit. In some embodiments, the runner mount assembly 160 may be coupled to the shaft 106 as a component subject to a clamping load. For example, the runner mounting assembly 160 may be held in place relative to the shaft 106 by a spanner nut that imparts axial force on the runner mounting assembly 160. The runner mounting assembly 160 may be carried directly by the shaft 106 (i.e. the runner mounting assembly 160 contacts the shaft 106) or may be carried by the shaft 106 via intervening structures such as a block carried by the shaft 106.

The runner mounting assembly 160 may comprise one or more shaft engaging flanges 201, one or more runner engaging flanges 203, and a central junction portion 205. In some embodiments the runner mounting assembly 160 comprises a pair of shaft engaging flanges 201, a pair of runner engaging flanges 203, and a central junction portion 205.

The central junction portion 205 is radially spaced from the shaft 106. The central junction portion 205 may be annular. The central junction portion 205 may be formed as a continuous annular member, as a segmented annular member, or as discrete portions extending about a circumference of the runner mounting assembly 160. The central junction portion 205 may join one or more shaft engaging flanges 201 and/or one or more runner engaging flanges 203.

The pair of shaft engaging flanges 201 may comprise a first or forward shaft engaging flange 201-A and a second or aft shaft engaging flange 201-B. Each shaft engaging flange 201 may extend axially from the central junction portion 205 and may terminate in a shaft engaging portion 207. The shaft engaging portion 207 may engage the shaft 106 and/or contact the shaft 106. In some embodiments each shaft engaging flange 201 may extend axially and radially from the central junction portion 205. Each shaft engaging flange 201 may deflect to maintain engagement of the runner 112 with the seal ring 110 while accommodating thermal expansion of the shaft 106. Each shaft engaging flange 201 may impart spring action to maintain engagement of the runner 112 with the seal ring 110 while accommodating thermal contraction of the shaft 106. The shaft engaging flanges 201 may be fit to the shaft 106, for example with an interference, clearance, or transitional fit.

The pair of runner engaging flanges 203 may comprise a first or forward runner engaging flange 203-A and a second or aft runner engaging flange 203-B. Each runner engaging flange 203 may extend axially from the central junction portion 205 and may terminate in a runner mount land 209. The runner mount land 209 may support, engage, or contact the runner 112, and more specifically the radially inward facing surface 125 of the runner 112. The runner engaging flanges 203 and/or the runner mount lands 209 may be fit to the runner 112, for example with an interference, clearance, or transitional fit. In some embodiments each shaft engaging flange 201 may extend axially and radially from the central junction portion 205. Each runner engaging flange 203 may deflect to maintain engagement of the runner 112 with the seal ring 110 while accommodating thermal expansion of the shaft 106. Each runner engaging flange 203 may impart spring action to maintain engagement of the runner 112 with the seal ring 110 while accommodating thermal contraction of the shaft 106.

As further described below with reference to FIGS. 3A through 5B, the central junction portion 205 may be positioned within the runner mount assembly 160 at a variety of axial and radial positions in order to optimize deflection of the runner mount assembly 160 and/or stresses of the runner 112. For example, in some embodiments the central junction portion 205 may be positioned at an axial midpoint between an axial terminus of each of the shaft engaging flanges 201 and/or runner engaging flanges 203. In other embodiments the central junction portion 205 may be positioned at an offset from the axial midpoint between an axial terminus of each of the shaft engaging flanges 201 and/or runner engaging flanges 203.

The shaft engaging flanges 201 and/or runner engaging flange 203 may be joined by the central junction portion 205. The shaft engaging flanges 201 and/or runner engaging flange 203 provide a spring action retention of the runner 112 to maintain the runner sealingly engaged with the seal ring 110 during various operating conditions and transients. The shaft engaging flanges 201 and/or runner engaging flange 203 may comprise metal, such as steel, titanium, Inconel, and/or controlled expansion alloys. The shaft engaging flanges 201 and/or runner engaging flange 203 may be coated with an anti-fretting material such Titanium Nitride (TiN) or Titanium Anodize.

Each of the shaft engaging flanges 201 and/or runner engaging flange 203 impart a radially outward spring force and deflect to maintain the runner 112 sealingly engaged with the seal ring 110 as the rotating machine operates. During periods of thermal expansion, or when components are in a thermally expanded state, the shaft engaging flanges 201 and/or runner engaging flange 203 may deflect to accommodate the thermal expansion of the shaft 106 relative to the runner 112. This deflection accommodates the shrinking radial dimension of the space between the runner 112 and the shaft 106.

The magnitude and rate of stress on the runner 112 during period of thermal expansion are greatly reduced as compared to existing clip-type runner mounts and other runner mounts. Even at the high operating temperatures experienced by certain seal assemblies during engine operation, the disclosed runner mounting assembly 160 supports the runner 112 while sufficiently compliant as to not cause excessive stresses on the runner 112. The runner mount assembly 160 is effective to dissipate stress and/or energy through deflection of the shaft engaging flanges 201 and/or runner engaging flange 203.

During periods of thermal contraction or when components are in a thermally contracted state, the shaft engaging flanges 201 and/or runner engaging flange 203 may provide spring action in a radially outward direction to accommodate the thermal contraction of the shaft 106. This spring action accommodates the increasing radial dimension of the space between the runner 112 and the shaft 106.

One of the runner engaging flanges 203 may include a radially-extending axial locator 168. The axial locator 168 may interface with lateral side of the runner 112 to assist with maintaining the axial positioning of the runner 112. For example, in the illustrated embodiment of FIG. 1 the aft runner engaging flange 203 includes an axial locator 168 that interfaces with a lateral side to arrest, minimize, or prevent axially-aft movement of the runner 112. The axial locator 168 may maintain an axial position of the runner 112 relative to the runner mounting assembly 160.

The runner mounting assembly 160 carries the runner 112. The runner 112 may be radially positioned between the one or more runner engaging flanges 203 and the seal ring 110, such that the radially inward facing seal surface 116 of the seal ring 110 sealingly engages the radially outward facing seal surface 120 of the runner 112 to thereby form a boundary between the higher pressure fluid cavity 104 and the lower pressure fluid cavity 102.

The runner mounting assembly 160 allows for relative movement between the runner 112 and the shaft 106, largely owing to different coefficients of thermal expansion of the materials of the runner 112 and the shaft 106. Due to the runner mounting assembly 160, the runner 112 may changing radial positioning relative to the shaft 106. In other words, the radial distance between the runner 112 and the shaft 106 may change during operation of the engine or rotating machine, such that the runner 112 is displaced from an initial position relative to the shaft 112.

The seal assembly 100 may further comprise an annular seal member 111. The annular seal member 111 is axially displaced from the seal ring 110 and may comprise a flexible and/or semi-rigid material. The annular seal member 111 may be referred to as a lip seal or a lip seal member. The annular seal member 111 may comprise Teflon or a Teflon derivative material. The annular seal member 111 may be an annular flexible ring that is flexed when positioned relative to the runner 112 (i.e. the annular seal member 111 may be flexed by contact with the runner 112).

In some embodiments, the seal assembly 100 further comprises a seal housing 122. The seal housing 122 may be disposed between the runner 112 and the housing 108, and/or between the seal ring 110 and the housing 108, and/or between the annular seal member 111 and the housing 108. The seal housing 122 may comprise a radially extending member 213 that engages a lateral surface of the seal ring 110.

In some embodiments, the seal assembly 100 further comprises a garter spring 129. The garter spring 129 may be disposed radially outward of and engaged with a radially outer surface of the seal ring 110. The garter spring 129 may aide with maintaining engagement of the seal ring 110 to the runner 112 across a predetermined range of rotational speeds.

In some embodiments, the seal assembly 100 further comprises one or more of a snap ring 133 and back plate 135. The snap ring 133 may extend between the seal housing 122 and the runner 112, and may be positioned axially aft of the seal ring 110. The back plate 135 may be positioned axially aft of the seal ring 110 and adjacent and/or abutting the snap ring 133.

In some embodiments an axial spring 211 or axial springs may be positioned between the back plate 135 and the seal ring 110. The axial spring 211 may assist with maintaining contact between the seal ring 110 and the seal housing 122.

In a non-operating condition, the shaft 106 is not rotating and the garter spring 129 imparts a radially inward force on the seal ring 110 to maintain the seal ring 110 sealingly engaged against the runner 112. The seal ring 110 sealingly engaged with the runner 112 and seal housing 122 creates a seal between the higher pressure fluid cavity 104 and the lower pressure fluid cavity 102. The seal ring 110 forms a boundary between the higher pressure fluid cavity 104 and the lower pressure fluid cavity 102.

When the rotating machine begins to operate, heat generated by the rotating machine will cause temperatures of all components to rise, including heat generated by friction between the seal ring 110 and runner 112. As the shaft 106 thermally expands in a radially outward direction, the shaft engaging flanges 201 and/or runner engaging flanges 203 may deflect to accommodate the compression between the runner 112 and the shaft 106. For example, the forward runner engaging flange 203-A may deflect axially forward and radially inward, while the aft runner engaging flange 203-B may deflect axially aft and radially inward. The radial dimension of FIG. 1 may be exaggerated to better illustrate the runner mounting assembly 160. The motion of the runner engaging flanges 203 dissipates energy while maintaining proper engagement between the runner 112 and seal ring 110.

During operation, in embodiments having a seal ring 110 and runner 112 with matched or nearly matched coefficients of thermal expansion, the seal ring 110 and runner 112 will thermally expand at the same or similar rates, assisting in the maintenance of engagement between the seal ring 110 and runner 112 throughout the full range of thermal transients caused by startup and operation of the rotating machine.

FIG. 2 presents an embodiment of the seal assembly 100 that includes an alternate configuration of the seal ring 110 and components radially outward of the seal ring 110. For example, in some embodiments the annular seal member 111 may be formed as a curved member having a J-shaped cross section. The annular seal member 111 may have a curvilinear face surface 131 that engages the radially outward facing seal surface 120 of the runner 112. The curvilinear face surface 131 may extend from an axially-facing surface to a radially-facing surface, and the radially-facing surface engages the radially outward facing seal surface 120 of the runner 112.

The seal ring 110 may define a plurality of apertures 117 that extend axially through the seal ring 110. During operation, with a higher fluid pressure in the higher pressure fluid cavity 104 as compared to the lower pressure fluid cavity 102, the apertures 117 direct a flow of buffer air from the higher pressure fluid cavity 104 toward the annular seal member 111. The plurality of apertures 117 may be dimensioned and/or spaced about the circumference of the seal ring 110 to achieve a desired flow rate of buffer air.

The flow of buffer air flows through the plurality of apertures 117 and contacts the curvilinear face surface 131 of the annular seal member 111. The flow of buffer air buffers the annular seal member 111. The flow of buffer air additionally reduces leakage from the lower pressure fluid cavity 102 toward the higher pressure fluid cavity 104 past the annular seal member 111 and/or the seal ring 110, by blowing back any oil into the lower pressure fluid cavity 102 if a leakage path develops in the seal ring 110 and/or annular seal member 111.

The seal housing 122 may comprise a forward seal housing 124 and an aft seal housing 126. The forward seal housing 124 may define a recess 128 or may cooperate with the aft seal housing 126 to define a recess 128. The recess 128 may be an annular groove. At least a portion of the annular seal member 111 may be disposed in or held in axial position by the recess 128. The forward seal housing 124 may be prevented from axially forward movement relative to the housing 108 by a housing stop 134.

The aft seal housing 126 may comprise an axially-extending portion 121 and a radially-extending portion 123. The axially extending portion 121 may be engaged with or in contact with the housing 108. The radially extending portion 123 may comprise an axially facing surface 132 and may be engaged with or in contact with the seal ring 110. The seal ring 110 may sealingly engage the axially facing surface 132 of the radially extending portion 123 of the seal housing 122. The seal ring 110 may be aided in sealingly engaging the axially facing surface 132 by the axial load on the seal ring 110 caused by the pressure difference between the higher pressure cavity 104 and lower pressure cavity 102. The forward seal housing 124 and aft seal housing 126 may be integrally formed as a single seal housing 122.

During operation, a differential pressure between the fluid pressures of the higher pressure fluid cavity 104 and the lower pressure fluid cavity 102 may create a flow of buffer air. The flow of buffer air flows through the plurality of apertures 117 of the seal ring 110 and contacts the curvilinear face surface 131 of the annular seal member 111. The flow of buffer air buffers the annular seal member 111. The flow of buffer air additionally reduces leakage from the lower pressure fluid cavity 102 toward the higher pressure fluid cavity 104 past the annular seal member 111 and/or the seal ring 110.

FIGS. 3A through 5B present various embodiments of a runner mount assembly 160. The runner mount assembly 160 may be configured to achieve a desired rate and shape of deflection. The runner mount assembly 160 may be configured to achieve a desired stress profile on the runner 112. Variables that may be altered when implementing a runner mount assembly 160 consistent with the present disclosure include, but are not limited to, the radial and axial position of the central junction portion 205, the length and thickness of each shaft engaging flange 201 and each runner engaging flange 203, the length and shape of each runner mount land 209 and each shaft engaging portion 207, and the materials used to form the runner mount assembly 160 and each constituent part thereof.

Figure 3A:
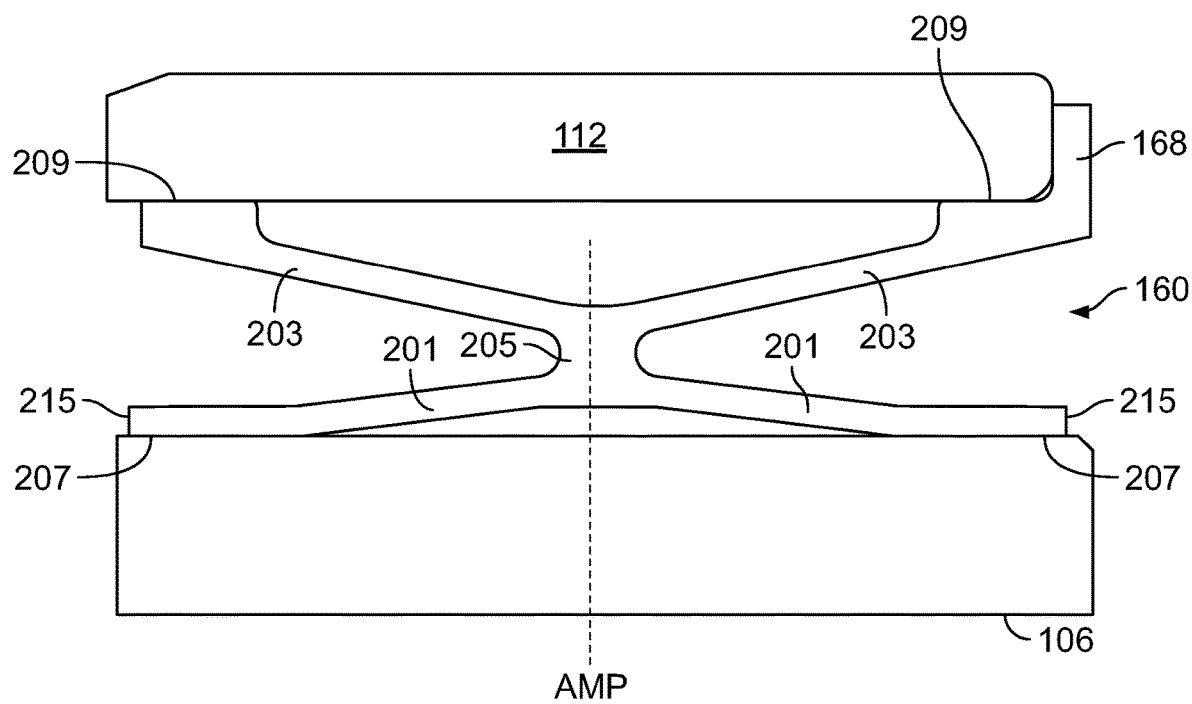
FIG. 3A is a detailed schematic cross sectional view of a runner and runner mount of a seal assembly in accordance with some embodiments of the present disclosure.
Figure 3B:
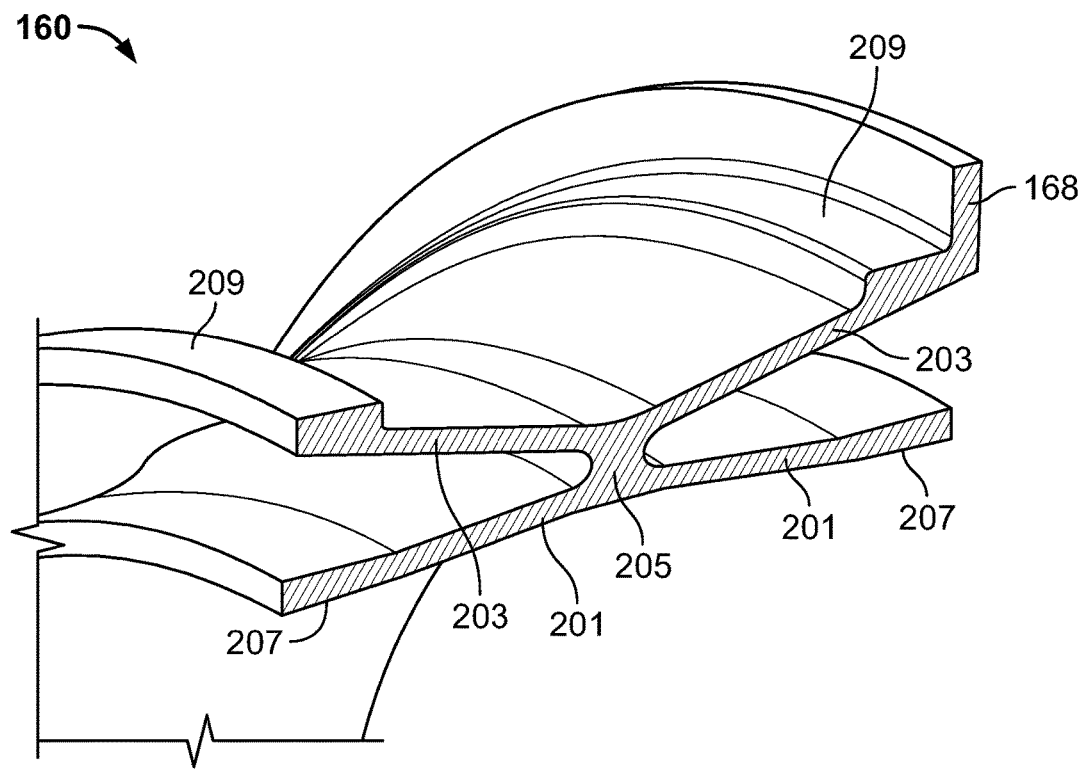
FIG. 3B is an isometric view of the runner mount assembly of FIG. 3A, in accordance with some embodiments of the present disclosure.

FIGS. 3A and 3B show a runner mount assembly 160 comprising a pair of shaft engaging flanges 201 and a pair of runner engaging flanges 203. Each flange 201, 203 extends from a central junction portion 205. The central junction portion 205 is positioned at an axial midpoint AMP between an axial terminus 215 of each shaft engaging flange 201. In some embodiments the axial midpoint AMP may be measured between an axial terminus of each runner engaging flange 203.

The central junction portion 205 may be positioned radially inward of a radial midpoint between a radial terminus of the forward runner engaging flange 203-A and the forward shaft engaging flange 201-A. In other words, the central junction portion 205 may be radially biased toward the axis of rotation A of the shaft 106 and/or the engine centerline. Radially biasing the central junction portion 205 as shown in FIG. 3A may serve to limit the radial component of a clamp force on the runner mounting assembly 160.

Figure 4A:
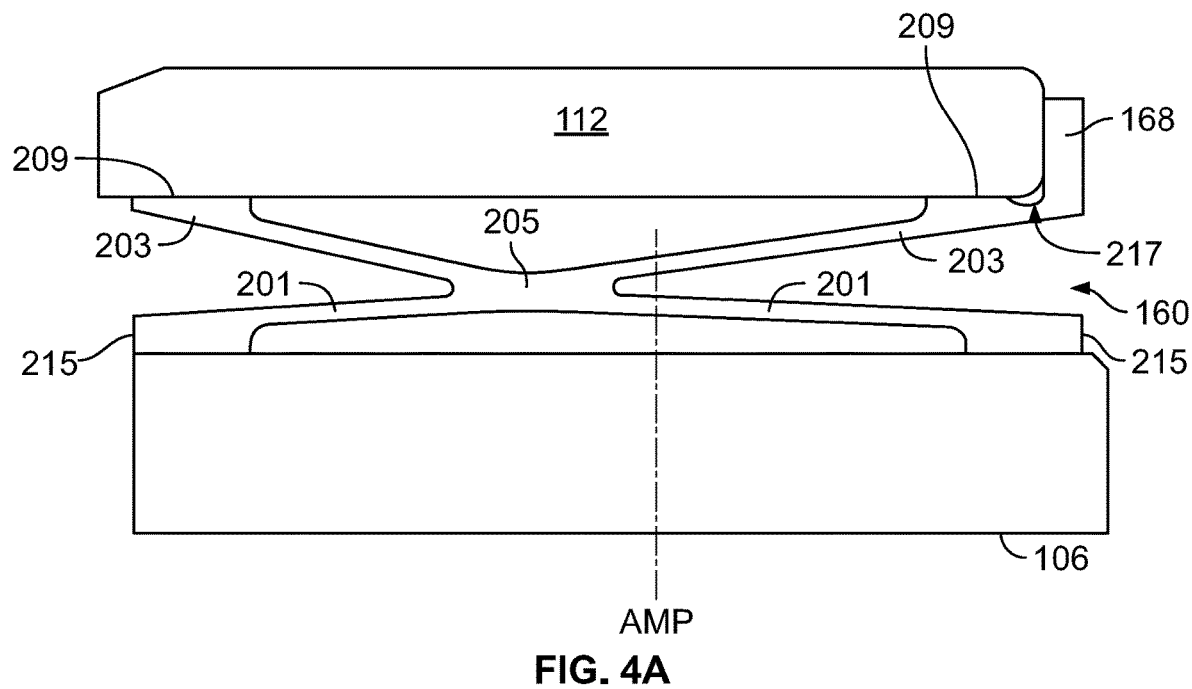
FIG. 4A is a detailed schematic cross sectional view of a runner and runner mount of a seal assembly in accordance with some embodiments of the present disclosure.
Figure 4B:
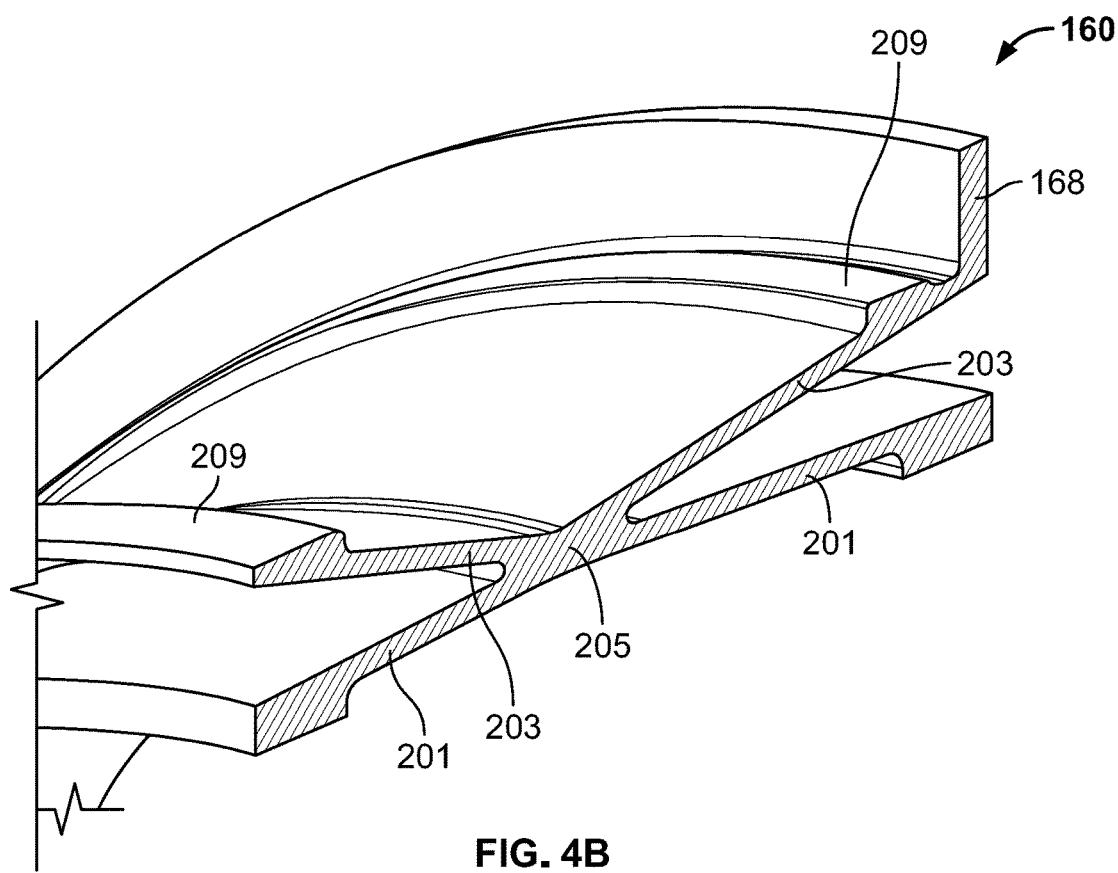
FIG. 4B is an isometric view of the runner mount assembly of FIG. 4A, in accordance with some embodiments of the present disclosure.

FIGS. 4A and 4B show a runner mount assembly 160 with a central junction portion 205 positioned axially forward of the axial midpoint AMP between an axial terminus 215 of each shaft engaging flange 201. Since the axial locator 168 extends from the aft runner engaging flange 203-B, in this configuration of the runner mount assembly 160 the axially forward biasing of the central junction portion 205 aids in balancing the stiffness of each runner engaging flange 203. The embodiment of FIGS. 4A and 4B additionally features a relatively shallow angle of the shaft engaging flanges 201 to have the majority of the clamp load move through the runner mounting assembly 160 axially. The central junction portion 205 is biased toward the axis of rotation A. The embodiment also shows an annular channel 217 that separates the aft mount land 209 from the axial locator 168 to improve or adjust stress distribution imparted to the runner 112.

Figure 5A:
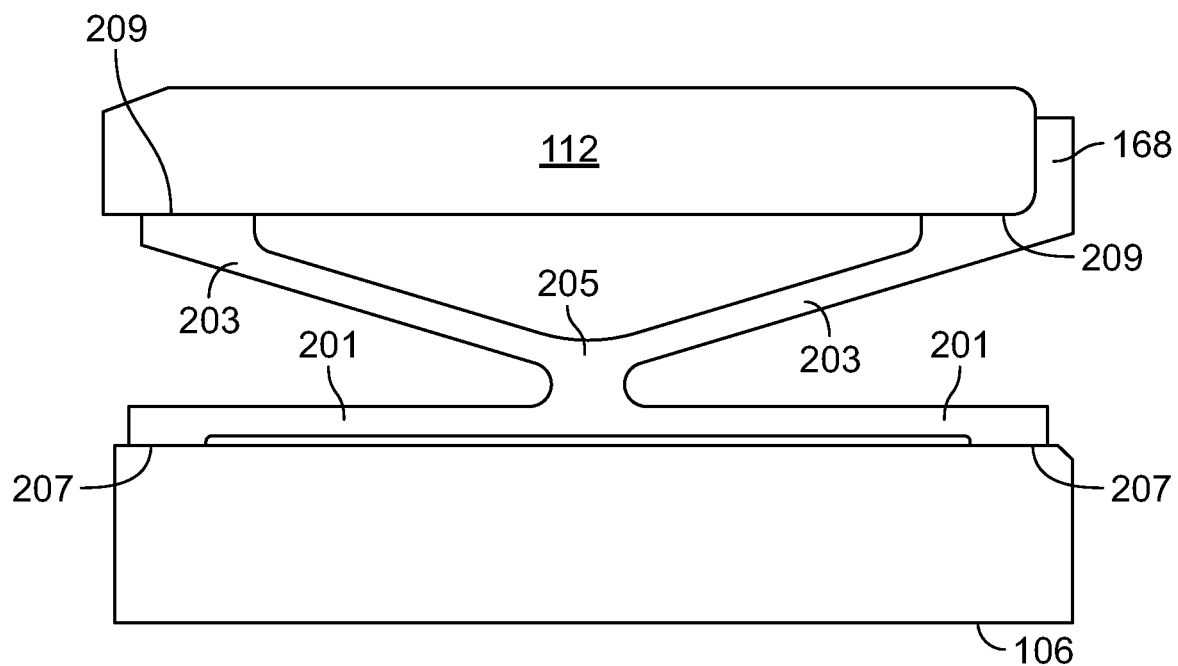
FIG. 5A is a detailed schematic cross sectional view of a runner and runner mount of a seal assembly in accordance with some embodiments of the present disclosure.
Figure 5B:
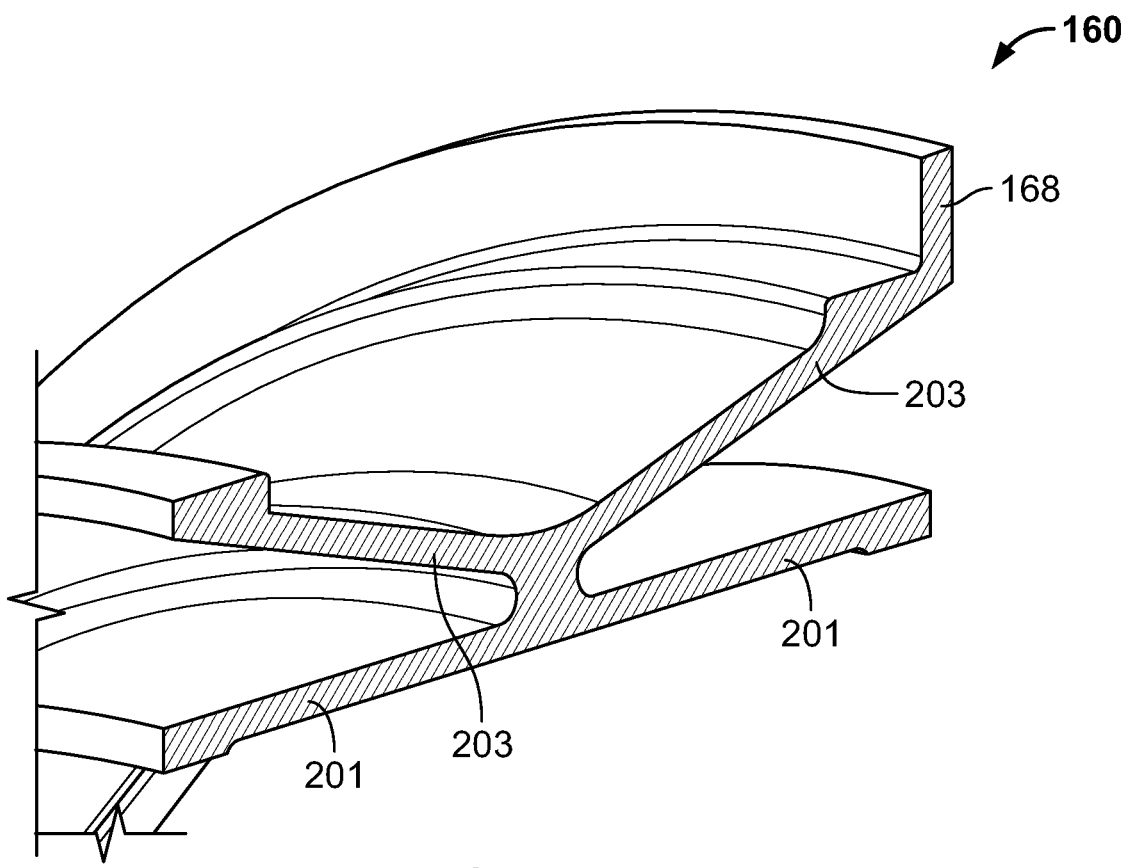
FIG. 5B is an isometric view of the runner mount assembly of FIG. 5A, in accordance with some embodiments of the present disclosure.

FIGS. 5A and 5B show a runner mount assembly 160 with a maximum radially inward bias to the central junction portion 205. The central junction portion 205 is nearly in contact with the shaft 106, such that the shaft engaging flanges 201 extend from the central junction portion 205 is an exclusively or nearly-exclusively axial direction. This embodiment reduces the likelihood of introducing radial stresses into the runner mounting assembly 160 due to clamp loads.

Figure 6A:
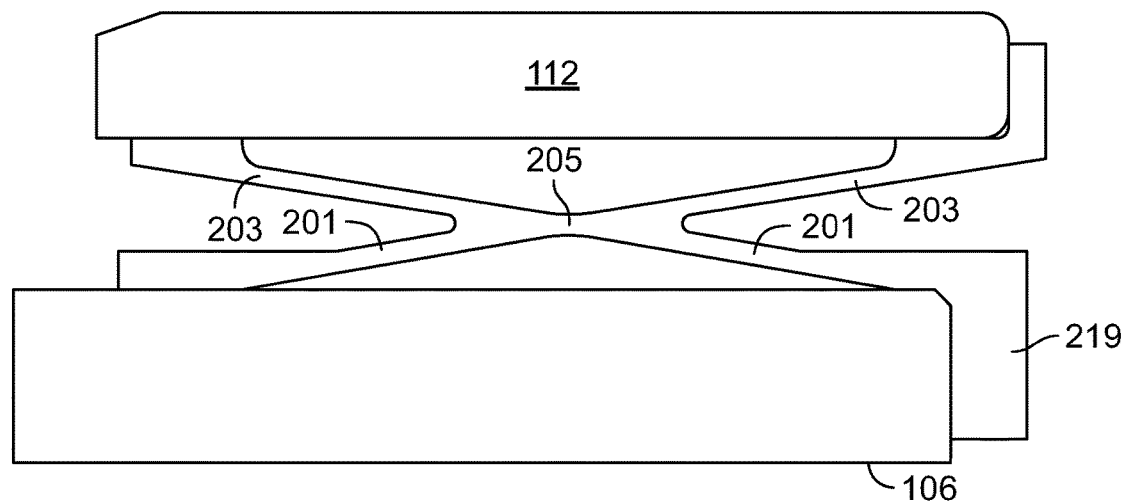
FIG. 6A is a detailed schematic cross sectional view of a runner and runner mount of a seal assembly in accordance with some embodiments of the present disclosure.
Figure 6B:
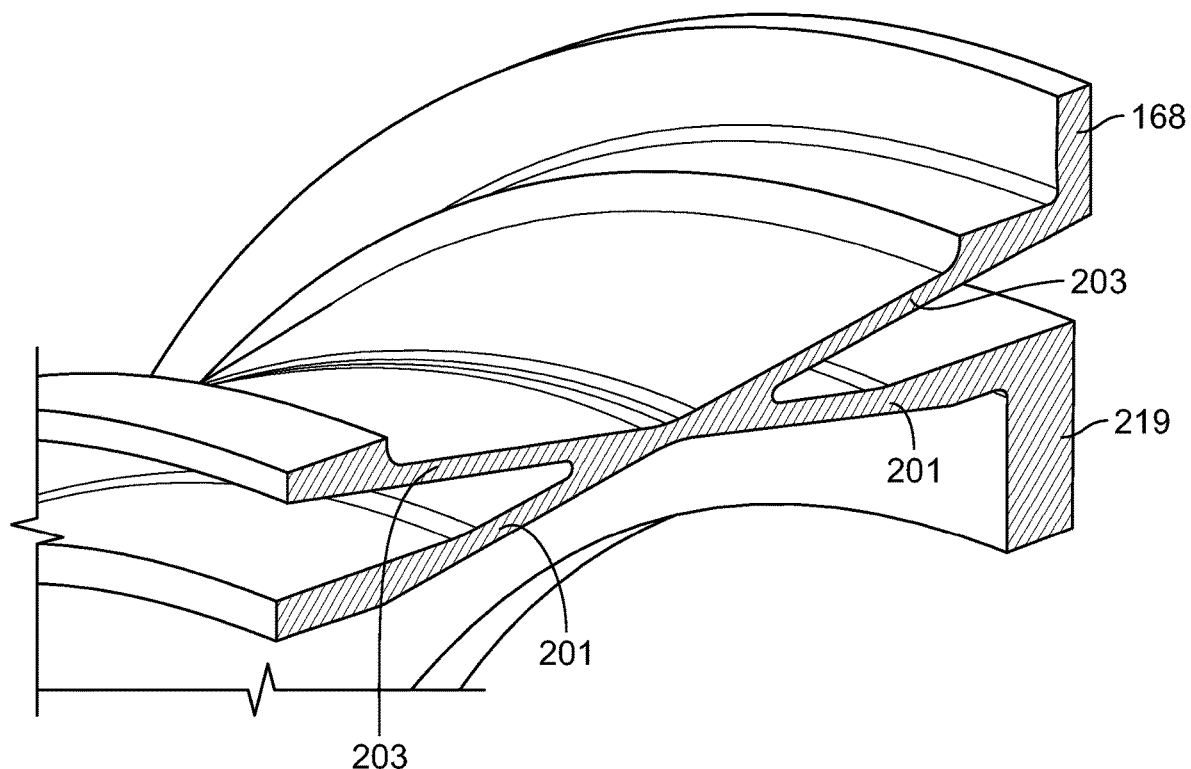
FIG. 6B is an isometric view of the runner mount assembly of FIG. 6A, in accordance with some embodiments of the present disclosure.
Figure 6C:
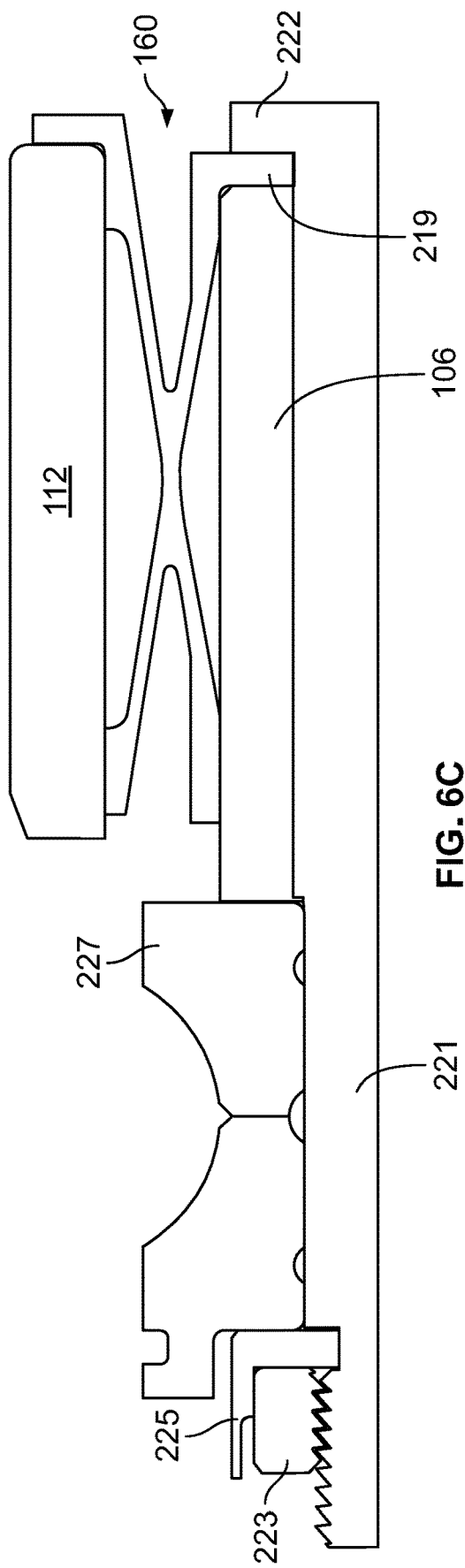
FIG. 6C is an expanded schematic cross sectional view of the runner and runner mount assembly of FIG. 6A, in accordance with some embodiments of the present disclosure.

FIGS. 6A, 6B, and 6C show a runner mounting assembly 160 having an axial retainer 219 that extends radially inward from one of the shaft engaging flanges 201 to aid in maintaining the position of the runner mounting assembly 160 relative to the shaft 106. In embodiments having the runner mounting assembly 160 coupled to the shaft 106 via a clamping load, the axial retainer may be subject to the clamping load, thus reducing clamping stresses on other portions of the runner mounting assembly 160. This embodiment has a central junction portion 205 positioned at an axial midpoint between an axial terminus 215 of each shaft engaging flange 201 and positioned at a radially inward bias.

As shown in FIG. 6C, the runner mounting assembly 160 may be secured to a threaded shaft 221 with a clamping force. The referenced shaft 106 may be coupled to and/or carried by the threaded shaft 221. The threaded shaft 221 may have a radial member 222 that contacts the shaft 106 and/or the axial retainer 219. The clamping load may be applied, for example, by a spanner nut 223 that is threadably coupled to the threaded shaft 221 and tightened to apply a clamping force. In the embodiment of FIG. 6C, the runner mounting assembly 160 is coupled to the threaded shaft 221 by a clamping force applied to hold the axial retainer 219 between the radial member 222 and shaft 106. There may be one or more intervening structures between the runner mounting assembly 160 and either of the radial member 222 and spanner nut 223, such as the illustrated washer 225 and bearing race 227.

Figure 7A:
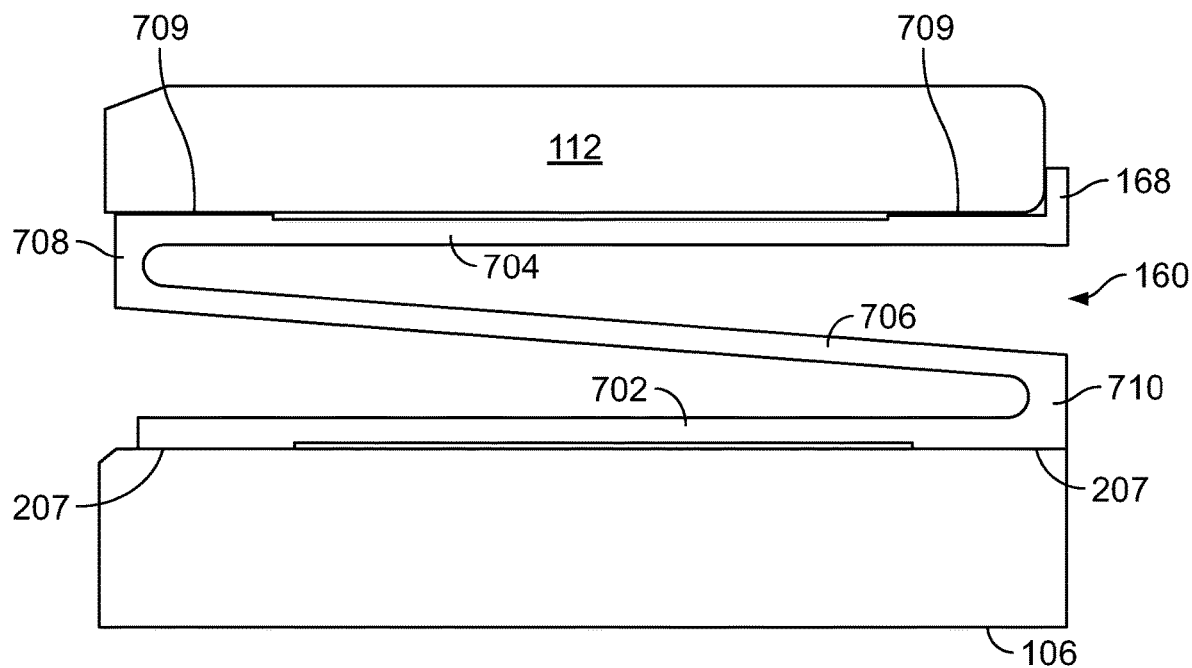
FIG. 7A is a detailed schematic cross sectional view of a runner and runner mount of a seal assembly in accordance with some embodiments of the present disclosure.
Figure 7B:
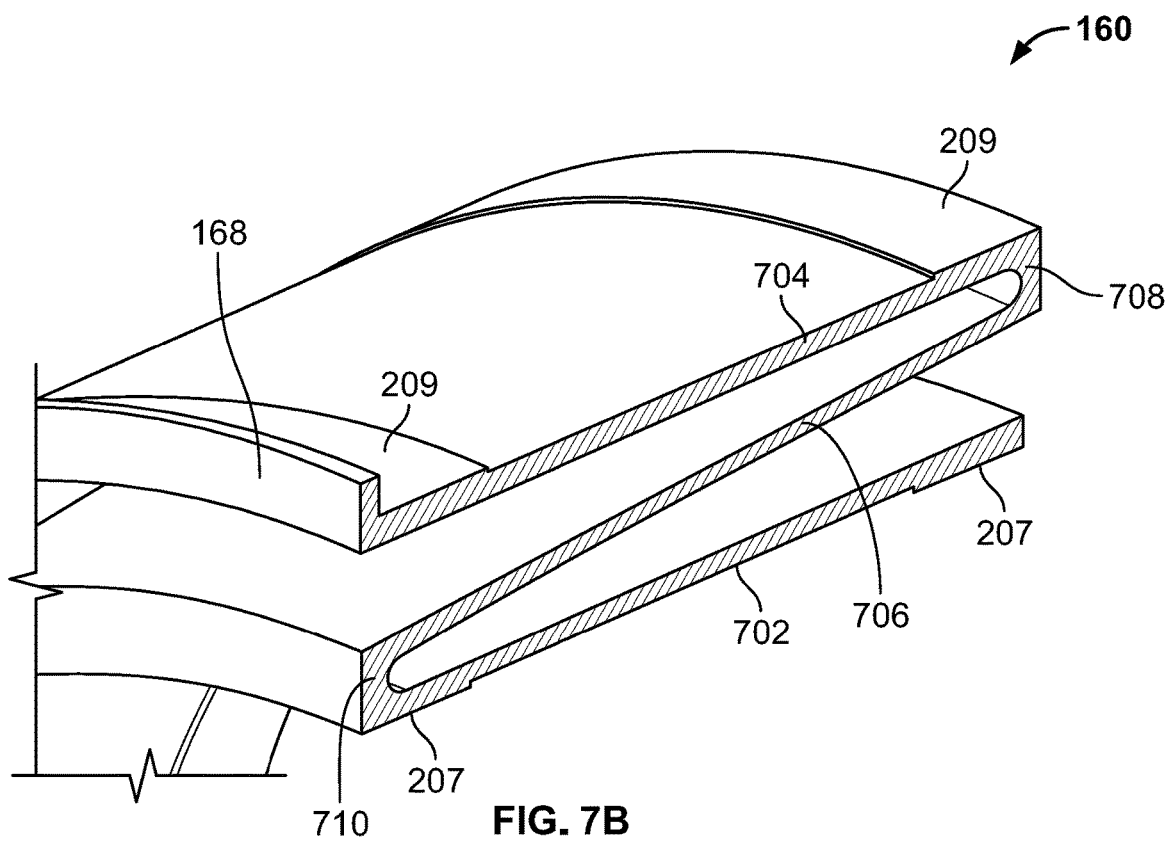
FIG. 7B is an isometric view of the runner mount assembly of FIG. 3A, in accordance with some embodiments of the present disclosure.

Whereas the previously discussed embodiments of the present disclosure have a runner mounting assembly 160 with an X-shaped cross section, the present disclosure contemplates additional cross sectional shapes of the runner mounting assembly 160. As shown in FIGS. 7A and 7B, the runner mounting assembly 160 may comprise a Z-shaped cross section. The runner mounting assembly 160 may comprise a shaft engaging flange 702, a runner engaging flange 704, and a joining flange 706.

The shaft engaging flange 702 may extend in a predominantly axial direction and may be spaced from shaft 106 along a majority of the length of the shaft engaging flange 702. The shaft engaging flange 702 may define one or more shaft engaging portions 207 that engage or contact the shaft 106. The runner engaging flange 704 may extending in a predominantly axial direction and may be spaced from the runner 112 along a majority of the length of the runner engaging flange 704. The runner engaging flange 704 may define one or more mount lands 709.

The joining flange 706 may extend between the shaft engaging flange 702 and the runner engaging flange 704. The joining flange 706 may be joined to the runner engaging flange 704 at an axially forward junction portion 708. The joining flange 706 may be joined to the shaft engaging flange 702 at an axially aft junction portion 710.

The runner mounting assembly 160 of FIGS. 7A and 7B may deflect and/or impart spring action to accommodate thermal expansion and/or contraction of the shaft 106 relative to the runner 112.

Figure 8:
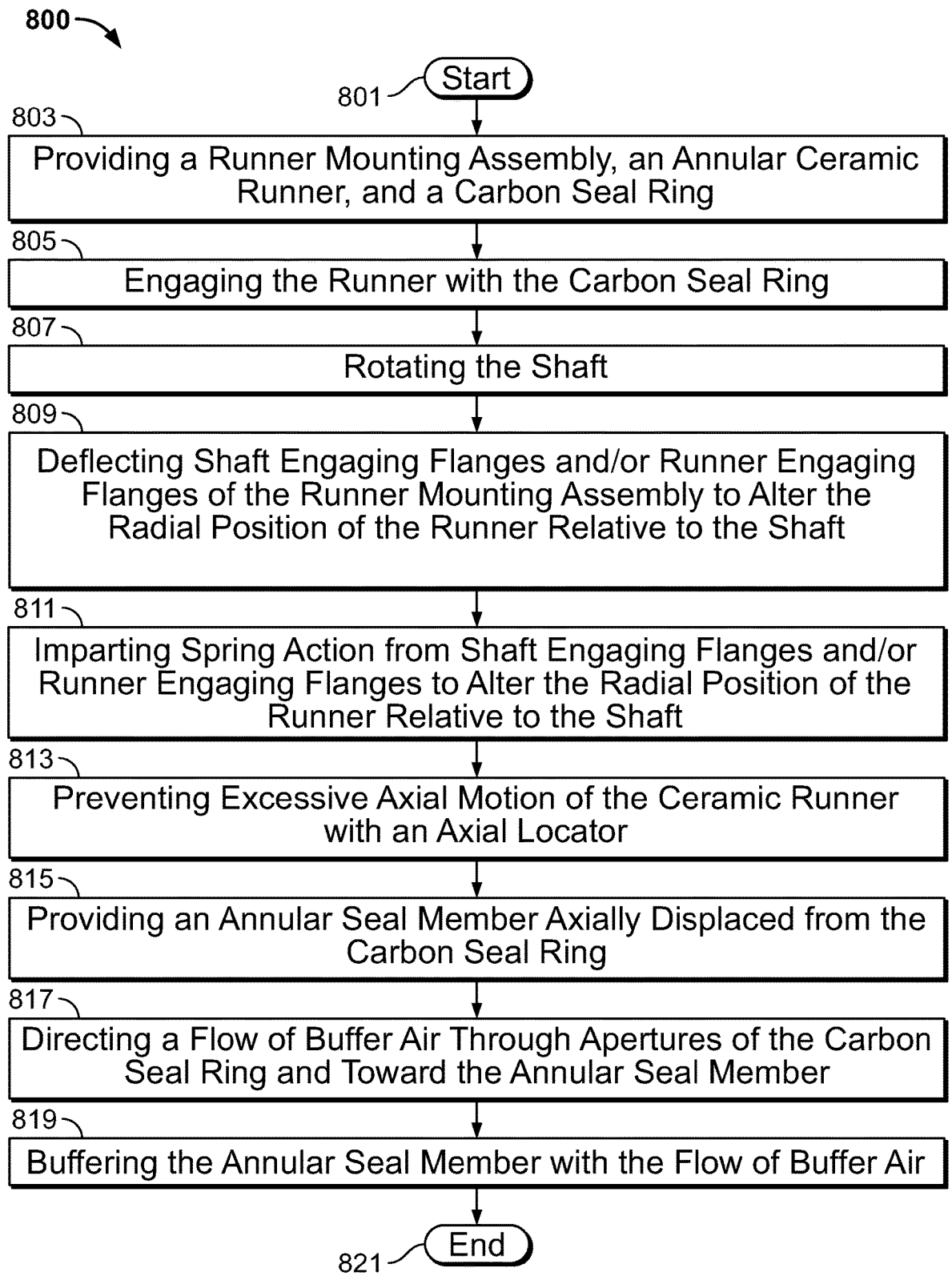
FIG. 8 is a flow diagram of a method in accordance with some embodiments of the present disclosure.

The present disclosure additionally provides methods of sealing a higher pressure fluid cavity 104 from a lower pressure fluid cavity 102. FIG. 8 presents a flow chart of one such method 800. The higher pressure fluid cavity 104 and lower pressure fluid cavity 102 are at least partly disposed between a rotatable shaft 106 and a housing 108 radially displaced from the rotatable shaft 106.

Method 800 starts at Block 801. The steps of method 800, presented at Blocks 801 through 821, may be performed in the order presented in FIG. 8 or in another order. One or more steps of the method 800 may not be performed.

At Block 803, a runner mount assembly 160, runner 112, and seal ring 110 may be provided. The runner mount assembly 160 may comprise an annular central junction portion 205 radially spaced from the shaft 106, a pair of shaft engaging flanges 201 and a pair of runner engaging flanges 203. The pair of shaft engaging flanges 201 may extend axially from the central junction portion 205 and may each terminate in a shaft engaging portion 207. The pair of runner engaging flanges 203 may extend radially outward and axially from the central junction portion 205, and may each terminate in a runner mount land 209.

The runner 112 and seal ring 110 may be sealingly engaged at Block 805. At Block 807, the shaft 106 may be rotated. Rotation of the shaft 106 may generate heat in the rotating machine, either through operation of the machine and/or friction between rotating and non-rotating components. This heat generation will cause the shaft 106 to thermally expand.

At Block 809 the shaft engaging flanges 201 and/or runner engaging flanges 203 may deflect to accommodate the thermal expansion of the shaft 106 while maintaining engagement of the runner 112 and seal ring 110. Thermal expansion of the shaft 106 reduces the radial dimension separating the runner 112 from the shaft 106. The shaft engaging flanges 201 and/or runner engaging flanges 203 may deflect axially and radially to accommodate this change in the radial dimension while ensuring continued engagement of the runner 112 and seal ring 110.

At Block 811 the shaft engaging flanges 201 and/or runner engaging flanges 203 may impart spring action to accommodate the thermal contraction of the shaft 106 resulting from cooling operating temperatures, reduced friction, or machine shut down, while maintaining engagement of the runner 112 and seal ring 110. Thermal contraction of the shaft 106 increases the radial dimension separating the runner 112 from the shaft 106. The shaft engaging flanges 201 and/or runner engaging flanges 203 may spring axially and radially to accommodate this change in the radial dimension while ensuring continued engagement of the runner 112 and seal ring 110.

At Block 813 excessive axial motion of the runner 112 is prevented by one or more of the axial locators 168 of the runner mounting assembly 160. The axial locator 168 may extend from one or both of the forward runner engaging flange 203-A and the aft runner engaging flange 203-B. The axial locator 168 may constrain excessive axial motion of the runner 112.

At Block 815 an annular seal member 111 may be provided. A flow of buffer air may be directed through one or more apertures 117 in the seal ring 110 at Block 817. The buffer air flow is directed toward the annular seal member 111. At Block 819, the buffer air flow buffers the annular seal member 111.

The method 800 may further comprise engaging a garter spring 129 about the seal ring 110 and may aid in maintaining the seal ring 110 engaged with the runner 112.

Method 800 ends at Block 821.

The present disclosure provides numerous advantages over existing seal assemblies. For example, the presently disclosed seal assembly 100 and method 800 of forming a seal reduce edge loading and overall stresses experienced in clip-style runner mounts and other runner mounts. By mounting the runner from the inner diameter of the runner alone, as opposed to mounting from the inner and outer diameters, the runner/runner mount interface along the outer diameter is eliminated and therefore the edge loading at that interface is also eliminated. The disclosed seal assembly provides improved load distribution and minimized tensile stresses in the runner.

By mounting the runner from the inner diameter alone, the presently disclosed seal assembly also frees space along the outer diameter to have a larger sealing surface. This may enable the inclusion of a lip seal along the sealing surface, owing to the greater size of the sealing surface. The use of inner diameter mounting additionally ensures that the radially outward facing seal surface of the runner is free of loading from the runner mount assembly.

The disclosed runner mount assembly may be a single-piece, compliant member and may therefore be easier to manufacture and install than existing mount assemblies. The disclosed seal assembly may be advantageously used in applications where a seal assembly is required in an extremely tight space. For example, the seal assembly may be positioned in applications where the radial gap between the shaft and ceramic runner is less than 0.5 inches. The disclosed seal assembly is also advantageously used in applications requiring a relatively small axial footprint. The seal assembly was designed for small space applications while maintaining adequate runner support and ease of assembly and manufacturability. The improved ease of assembly may result in fewer runners that are damaged or degraded during the assembly process.

Although examples are illustrated and described herein, embodiments are nevertheless not limited to the details shown, since various modifications and structural changes may be made therein by those of ordinary skill within the scope and range of equivalents of the claims.

What is claimed is:

1. A seal assembly for sealing a higher pressure fluid cavity from a lower pressure fluid cavity, said cavities at least partially disposed between a rotatable shaft and a housing radially displaced from said rotatable shaft, said seal assembly comprising:
    a runner mounting assembly carried by the shaft, said runner mounting assembly comprising:
        an annular central junction portion radially spaced from the shaft;
        a pair of shaft engaging flanges extending axially from said central junction portion, each of said flanges terminating in a shaft engaging portion; and
        a pair of runner engaging flanges extending radially outward and axially from said central junction portion, each of said flanges terminating in a runner mount land;
    a carbon seal ring sealingly engaged with the housing and having a radially inward facing seal surface; and
    an annular ceramic runner having a radially outward facing seal surface and a radially inward facing mount surface, said runner being radially positioned between said runner mount lands and said carbon seal ring so that said radially inward facing seal surface of said carbon seal ring sealingly engages said radially outward facing seal surface of said runner to thereby form a boundary between the higher pressure fluid cavity and the lower pressure fluid cavity;
    wherein said pair of shaft engaging flanges comprises a first shaft engaging flange extending axially forward and radially inward directly from the central junction portion and a second shaft engaging flange extending axially aft and radially inward directly from the central junction portion;
    wherein said pair of runner engaging flanges comprises a first runner engaging flange extending axially forward and radially outward directly from the central junction portion and a second runner engaging flange extending axially aft and radially inward directly from the central junction portion; and
    wherein the first shaft engaging flange is spaced apart radially from the first runner engaging flange and the second shaft engaging flange is spaced apart radially from the second runner engaging flange.

2. The seal assembly of claim 1 wherein at least one of the pair of shaft engaging flanges and the pair of runner engaging flanges deflect to maintain engagement of the ceramic runner and seal ring while accommodating thermal expansion of the shaft.

3. The seal assembly of claim 2 wherein at least one of the pair of shaft engaging flanges and the pair of runner engaging flanges impart spring action to maintain engagement of the ceramic runner and seal ring while accommodating thermal contraction of the shaft.

4. The seal assembly of claim 3 wherein said radially outward facing seal surface of said ceramic runner is free of loading from the runner mounting assembly.

5. The seal assembly of claim 1 wherein said central junction portion is positioned at an axial midpoint between an axial terminus of each of said pair of shaft engaging flanges.

6. The seal assembly of claim 1 wherein said central junction portion is positioned at an offset from an axial midpoint between an axial terminus of each of said pair of shaft engaging flanges.

7. The seal assembly of claim 1 wherein one of the pair of shaft engaging flanges comprises an axial retainer to maintain an axial position of the runner mounting assembly relative to the shaft.

8. The seal assembly of claim 1 wherein one of the pair of runner engaging flanges comprises an axial locator to maintain an axial position of the ceramic runner relative to the runner mounting assembly.

9. The seal assembly of claim 1 wherein said runner and said seal ring are formed from materials having coefficients of thermal expansion that are matched to effect sealing engagement between said runner and said seal ring over a predetermined range of operating temperatures.

10. The seal assembly of claim 1 further comprising a garter spring coupled to a radially outward facing surface of the seal ring, the garter spring sealingly engaging the radially inward facing seal surface of the seal ring with the radially outward facing seal surface of the ceramic runner across a predetermined range of rotational speeds.

11. The mount of claim 1 wherein the pair of shaft engaging flanges are axially aligned with the pair of runner engaging flanges.

12. A mount for carrying a ceramic runner from a rotatable shaft, said mount comprising:
   an annular central junction portion;
   a pair of shaft engaging flanges extending axially from said central junction portion, each flange of said pair of flanges terminating in a shaft engaging portion;
   a pair of runner engaging flanges extending axially and radially outward from said central junction portion, each of said flanges in said pair of runner engaging flanges terminating in a runner mount land; and
   an axial locator extending from one of the pair of runner engaging flanges to maintain an axial position of the ceramic runner relative to the runner mounting assembly.

13. The mount of claim 12 wherein said pair of shaft engaging flanges extend axially and radially inward from said central junction portion.

14. The mount of claim 13 wherein said central junction portion is positioned at an axial midpoint between an axial terminus of each of said pair of shaft engaging flanges.

15. The mount of claim 13 wherein said central junction portion is positioned at an offset from an axial midpoint between an axial terminus of each of said pair of shaft engaging flanges.

16. The mount of claim 12 further comprising an axial retainer extending from one of said pair of shaft engaging flanges to maintain an axial position of the runner mounting assembly relative to the shaft.

17. A method of sealing a higher pressure fluid cavity from a lower pressure fluid cavity, said cavities at least partially disposed between a rotatable shaft and a housing radially displaced from said rotatable shaft, the method comprising:
   providing a runner mounting assembly, an annular ceramic runner, and a carbon seal ring, wherein the runner mounting assembly is carried by the shaft and carries the ceramic runner, the runner mounting assembly comprising:
      an annular central junction portion radially spaced from the shaft;
      a pair of shaft engaging flanges extending axially from said central junction portion, each of said flanges terminating in a shaft engaging portion; and
      a pair of runner engaging flanges extending radially outward and axially from said central junction portion, each of said flanges terminating in a runner mount land;
   engaging the runner with the carbon seal ring;
   rotating the shaft; and
   deflecting at least one of the pair of shaft engaging flanges and pair of runner engaging flanges responsive to thermal transients to alter the radial position of the runner relative to the shaft;
   wherein said pair of shaft engaging flanges comprises a first shaft engaging flange extending axially forward and radially inward directly from the central junction portion and a second shaft engaging flange extending axially aft and radially inward directly from the central junction portion;
   wherein said pair of runner engaging flanges comprises a first runner engaging flange extending axially forward and radially outward directly from the central junction portion and a second runner engaging flange extending axially aft and radially inward directly from the central junction portion; and
   wherein the first shaft engaging flange is spaced apart radially from the first runner engaging flange and the second shaft engaging flange is spaced apart radially from the second runner engaging flange.

18. The method of claim 17 further comprising imparting spring action from at least one of the pair of shaft engaging flanges and pair of runner engaging flanges responsive to thermal transients to alter the radial position of the runner relative to the shaft.

19. The method of claim 17 wherein one of the pair of shaft engaging flanges comprises an axial retainer to maintain an axial position of the runner mounting assembly relative to the shaft.

20. The method of claim 17 wherein one of the pair of runner engaging flanges comprises an axial locator to maintain an axial position of the ceramic runner relative to the runner mounting assembly.

\* \* \* \* \*